Nov. 10, 1959 H. C. TALCOTT 2,912,502
WAYSTATION EMPLOYING TRANSISTOR AMPLIFIER
Filed July 9, 1956
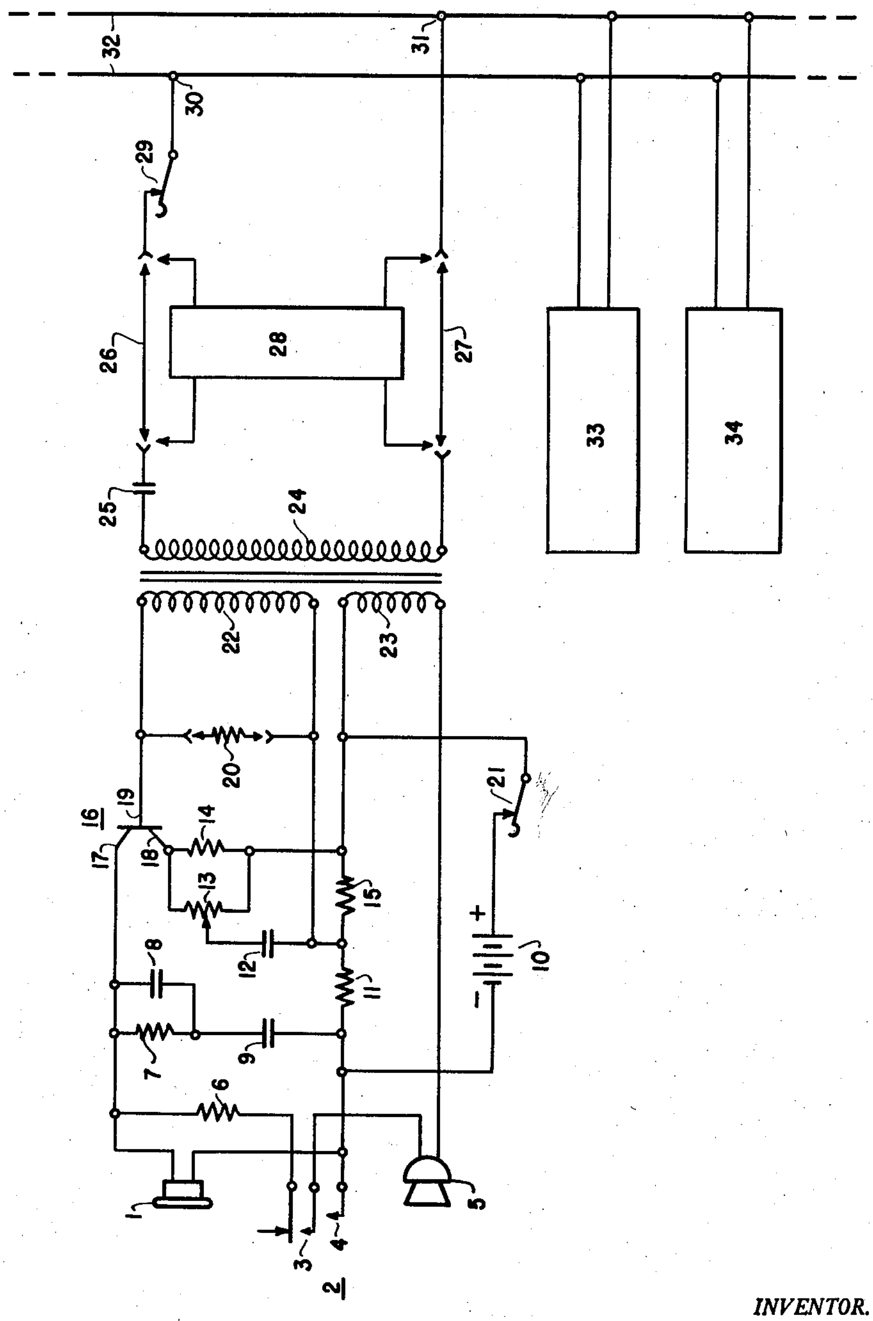
INVENTOR.
HORACE C. TALCOTT
BY McWatters Owen
ATTY.

United States Patent Office 2,912,502

Patented Nov. 10, 1959

2,912,502

WAYSTATION EMPLOYING TRANSISTOR AMPLIFIER

Horace C. Talcott, Downers Grove, Ill., assignor to General Telephone Laboratories, Incorporated, a corporation of Delaware Application July 9, 1956, Serial No. 596,632

8 Claims. (Cl. 179—1)

This invention relates to telephone systems in general, but, more particularly to train dispatching and similar systems in which a large number of stations, often referred to as waystations, are bridged across a common line.

The primary object of this invention is to improve the efficiency of such a waystation system in a simple manner. Generally speaking, this is accomplished by introducing a transistor amplifier at each waystation which amplifies the signal received at the station to a level that can be heard without difficulty at the waystation receiver. Preferably this is done in such a way that, at the same time, the impedance of the waystation as seen from the line is increased.

More particularly, it is a feature of the invention that the transistor amplifier is provided with degenerative feedback, and that the high input impedance of the negative feedback amplifier is thus utilized to reduce the bridging loss imposed by the waystation on the common line. For this reason, too, variations in volume due to the connection or disconnection of other waystations to or from the common line are minimized.

It is another object of this invention to provide a circuit arrangement wherein a transistor amplifier is integrated with the circuit elements of a local-battery telephone instrument in such a way as to amplify the voice currents incoming to the instrument.

A further object of the invention is to provide a transistor amplifier of the character described which may readily be added to a conventional waystation telephone instrument to convert this instrument to one of improved receiving efficiency.

The present invention is, in part, a further development of United States patent application Serial No. 460,574, filed on October 6, 1954, by A. H. Faulkner.

Other objects and features together with those described above will become evident upon a further examination of the following description, taken in conjunction with the accompanying drawing which illustrates an embodiment of the invention in the form of a schematic circuit diagram.

The drawing illustrates the circuit of a local battery waystation of generally conventional design except for the transistor amplifier included in the receiving path and the components required for the operation of this amplifier. This waystation circuit is adapted to be connected to associated telephone line 32 through switchhook contact 29 and line terminals 30 and 31. Briefly described, the waystation circuit comprises a transmitter 5, receiver 1, and talk switch 2, all of which are preferably mounted in a handset; an induction coil including secondary windings 22 and 23, and line winding 24; a local battery 10; hookswitch contacts 21 and 29; and a transistor amplifier, including transistor 16, a voltage divider including resistors 11 and 15, and an equalizing network consisting of condensers 8 and 9 and resistor 7. Except for the amplifier, this circuit is representative of standard waystation equipment, and the amplifier is designed so that it may be readily added to the standard equipment.

With the hookswitch in operated position, that is, with the handset removed, line winding 24 is connected in series with condenser 25, lead 26 and lead 27, across line terminals 30 and 31, to form a common channel for the transmission and reception of signal currents to and from the associated line. A local transmitting circuit is provided which includes a transmitter 5, talk switch contact 4, local battery 10, hookswitch contact 21, and secondary winding 23 of the induction coil. A local receiving path is also provided, including receiver 1, transistor 16 and the associated components of the amplifier circuit, and secondary winding 22 of the induction coil. During a telephone conversation between two subscribers of the waystation system, voice currents received by induction coil winding 24 are amplified by transistor 16 before being heard in receiver 1. Voice signals are transmitted from the waystation by operating talk-switch 2 and then speaking into transmitter 5, and the signal thereby set-up in winding 23 of the induction coil is induced into winding 24 and thereby sent out over the line.

*Detailed description*

Let us now assume that a calling subscriber at a particular waystation desires to place a call to another subscriber in the waystation system. The calling party must first operate the signalling equipment (not shown), to thereby audibly signal the called party that a call is present on the line. It is noted in passing, that this signalling equipment could be of any conventional type, such as, for example, the selective signalling arrangement commonly used in railroad dispatching systems; and that these waystation selecting systems may be arranged to provide for the establishment of a connection between any two of the waystations, or for connecting a group of waystations when a conference connection is desired. After both the calling and called subscribers have lifted the handset in response to said audible signal, hookswitch contacts 21 and 29 at both stations are operated to the position shown on the drawing, and the circuit is then prepared for conversation.

When voice signals are to be transmitted from the illustrated waystation, talk switch 2 is operated, thereby closing contacts 3 and 4. Talking battery for carbon microphone 5 is supplied from the negative terminal of battery 10 through talk-switch contact 4 and microphone 5, through induction coil winding 23, and then through hookswitch contact 21 to the positive terminal of the battery. The undulating currents developed through operation of transmitter 5 in response to sound waves impinging upon the diaphragm thereof, are, by induction, transmitted through winding 23 of the induction coil to the common transmitting and receiving channel which comprises condenser 25, and line winding 24 of the induction coil. This signal is thereby transmitted over the associated line 32 to the other waystations connected thereto, such as the waystations shown on the drawing as items 33 and 34.

When a signal is received at the illustrated waystation, incoming signal currents are caused to traverse a path which includes the line winding 24 of the induction coil. For purposes of this discussion, it will be assumed that leads 26 and 27 are a part of the circuit, and that filter 28 and resistor 20 are not used. The function of circuit elements 20 and 28 will be described below. The incoming signal is, by induction, transmitted to the local receiving circuit where it is amplified by the transistor amplifier, the amplified signal being used to energize receiver 1. It is noted in passing that, ordinarily, the talk switch is not operated when a signal is being received, and that the local transmitting circuit is therefore open at talk switch contact 4. The resistance in this transmitting circuit is therefore infinite, and none of the incoming signal energy is dissipated as losses therein. Thus, the incoming signal currents are reproduced with maximum efficiency by receiver 1.

The method of supplying the various transistor elements with the necessary direct current bias will now be described. A junction transistor of the P-N-P variety is used in the preferred embodiment of my invention. It will be noted that resistors 11 and 15 are connected across battery 10 in series with hookswitch contact 21, that the negative battery potential is impressed upon collector 17 of the transistor over a circuit including receiver 1, that the positive potential of the battery is impressed upon emitter 18 of the transistor over a circuit including resistors 13 and 14 in parallel, and that an intermediate D.C. voltage is taken from the junction of resistors 11 and 15 and impressed upon the base 19 of the transistor over a circuit including induction coil winding 22. Thus, the emitter is biased positively and the collector negatively with respect to the base. These bias voltages establish the necessary conditions for transistor action where a P-N-P transistor is used as shown. However, it should be understood that an N-P-N type transistor could be used, in which case the foregoing potentials would have to be reversed. With regard to the basic properties of such junction transistors, reference is made to an article by R. L. Wallace and W. J. Pietenpol, published in the IRE proceedings for July 1951, pages 753–767, entitled "Some Circuit Properties and Applications of N-P-N Transistors."

The base to emitter bias voltage required for transistors of this type is small, usually a mere fraction of a volt, and this voltage is obtained in the illustrated circuit as the difference between the relatively high voltage across voltage divider section 15 and the likewise high but opposing voltage drop across the parallel resistor combination including resistors 13 and 14, this last mentioned IR drop being due to the flow of emitter current through these resistors in parallel. In this connection, it should be remembered that in a junction transistor the emitter current is high compared with the base current, the latter being merely equal to the difference between the emitter and collector currents and the last mentioned two currents, in turn, being nearly equal to each other. The bias current set-up through the emitter-base path is self-stabilizing, and therefore largely independent of variations in the transistor constants such as variations due to temperature changes, by virtue of the fact that a tendency of the emitter current to increase would, because of the increased IR drop in resistors 13 and 14, tend to make the emitter potential less positive with respect to the base; this would, by virtue of the transistor mechanism itself, tend to reduce the emitter current. In this way, resistors 13 and 14 may be said to produce a direct current inverse feedback effect in the bias supply to transistor 16.

A voice frequency signal induced in winding 22 of the induction coil will set up voice currents in a path including winding 22, base 19, emitter 18, resistors 13 and 14 in parallel, resistor 15 and back to the other side of coil 22, a variable portion of resistance combination 13, 14, 15 being bypassed by condenser 12 depending on the slider setting of resistor 13. The voice frequency signal thereby impressed on this input circuit appears in amplified form in the transistor output circuit which extends from collector 17 through receiver 1, and through the network including the battery, resistors 11 and 15, condenser 12, and resistors 13 and 14, to emitter 18.

It will be understood from the foregoing description that a portion of resistance combination 13, 14, 15 which depends on the adjustment of the slider on resistor 13 is common to both the signal input and signal output circuits of transistor 16 and the resulting inverse feedback acts to reduce the gain. More particularly, as the sliding contact on resistor 13 is moved downward, as viewed in the drawing, more resistance is included in the common portion of the input and output circuits, and more reduction in gain is accordingly obtained. Thus, resistor 13 may be used as a volume control device.

This inverse feedback has the additional effect of increasing the input impedance of the transistor amplifier. As the sliding contact on resistor 13 is moved downward on the resistor, the A.C. base current corresponding to a given value of impressed signal voltage is reduced, with the result that the input impedance looking into the transistor is correspondingly increased. By proper selection of circuit components, I have found that the input impedance under conditions of maximum gain, that is with the slider on resistor 13 at the top, is approximately 1800 ohms; and that this impedance increases to approximately 50,000 ohms when the slider is moved to the bottom of resistor 13. This feature is of substantial benefit since it has the effect of reducing the bridging loss that is normally associated with a waystation type system, where a large number of stations may be simultaneously connected across the line. This feature will be discussed in more detail below.

It will be observed that an equalizing circuit consisting of capacitors 8 and 9, and resistor 7, is connected across the receiver in the above-described transistor output circuit. The components in this equalizing circuit are chosen so as to equalize the load impedance and thereby provide constant power output over the range of voice frequencies. Such a circuit is desirable in view of the fact that receiver 1 constitutes a high reactance load so that the high frequencies tend to be over-emphasized at reduced gain settings. By proper selection of components, I have been able to equalize the power to the receiver over the range of voice frequencies within approximately 2 db, while providing a power gain of approximately 12 db through the transistor amplifier.

It will be observed that the amplifier is not rendered inoperative during those periods when the local transmitting circuit is completed. Accordingly, if the party conversing over the established connection at the distant end thereof "breaks in" upon the speech of the party using the circuit illustrated, the signal currents thus transmitted to this circuit will be reproduced by receiver 1. The level of this "break in" signal is substantially attenuated, however, due to the fact that resistor 6 is shunted across the receiver when the talkswitch is operated. This causes the power level in the receiver to be reduced by aproximately 10 db. Resistor 6 is also effective to reduce the side tone in receiver 1, which would otherwise be objectionable due to the amplification by the transistor amplifier of signals induced in coil 22 when transmitter 5 is operated.

As mentioned above, this circuit has the advantage over the standard waystation circuit of presenting a high impedance to the line, thereby reducing the bridging loss. The input impedance to the transistor, as mentioned above, ranges from approximately 1800 to 50,000 ohms; and due to the turns-ratio of the induction coil, this impedance as seen from the line ranges from approximately .05 to aproximately 1.3 megohms. The standard waystream receiver presents an impedance of approximately 7,000 ohms to the line, and it is therefore seen that this system is a considerable improvement in this respect.

When the way station system is used in conjunction with a line which is simultaneously used for the transmission of carrier channels, a filter-circuit shown schematically as item 28 in Figure 1 is provided to select the voice frequency channel, i.e. the channel serving for communication between the waystations. When such a filter is provided, a resistor such as resistor 20 is provided across coil 22 so as to provide a proper impedance match for a maximum energy transfer.

Following is a list of typical values for the various components involved in the embodiment described herein:

| | | |
|---|---|---|
| Resistor 6 | ohms | 1000 |
| Resistor 7 | do | 2200 |
| Capacitor 8 | microfarads | 0.02 |
| Capacitor 9 | do | 0.25 |
| Resistor 11 | ohms | 470 |
| Capacitor 12 | microfarads | 0.25 |
| Resistor 13 | ohms | 1500 |
| Resistor 14 | do | 1000 |
| Resistor 15 | do | 150 |
| Resistor 20 | do | 270 |

Due to the small size of these components, I have found it convenient to mount them in the space ordinarily occupied by the dial of a conventional central-battery subset. In the case of a local-battery subset a dial is not used and the circular opening for the dial is covered by a dummy plate; thus, the amplifier components may readily be mounted on the underside of this plate, with the potentiometer control knob extending through a hole near the center of said plate so as to be readily accessible to the subscriber.

What has been described is considered to be the preferred embodiment of my invention and it is to be understood that modifications may be made in the structure and organization of the invention, in addition to those described, without departing from the spirit thereof as defined in the appended claims.

What I claim is:

1. In a telephone system, a line, several sub-stations connected in a conference connection in parallel to said line and each including a transmitter, a receiver and a transistor amplifier interposed between said line and said receiver for amplifying voice currents incoming to said receiver over said line, said transistor amplifier including a body of semiconductive material with base, emitter and collector electrodes, an input circuit to said amplifier including two of said electrodes and an output circuit including one of the last mentioned two electrodes, the third electrode and the receiver, and an impedance in series with said one electrode and common to both said input and output circuits so as to produce negative feedback of signal current, whereby the increase of input impedance of said amplifier incident to said negative feedback acts to reduce the bridging loss of said substation with respect to said line.

2. In a telephone system, the combination as claimed in claim 1 and including means for changing the magnitude of the impedance common with both said input and output circuits, thereby regulating the amount of negative feedback, and thus inversely changing the gain of said transistor amplifier.

3. In a train dispatching telephone system, a plurality of waystations, a telephone line interconnecting said waystations; each way station including a transformer having primary and secondary windings, the primary winding being bridged across said line, a receiver, a transistor amplifier including a body of semiconductive material having base, emitter and collector electrodes, and including a voice frequency input circuit comprising said secondary winding and a voice frequency output circuit comprising said receiver, and negative feedback means connected with said amplifier to render the input impedance of said waystation of a high magnitude and thereby minimize the bridging loss presented by each waystation to said telephone line.

4. In a telephone system, the combination as claimed in claim 3, wherein the waystation further includes a local battery, a carbon transmitter, and a voltage divider network connected to said electrodes for supplying bias potentials thereto, said local battery being in circuit connection with both said carbon transmitter and said network for feeding said transmitter and network with direct current.

5. In a telephone system, a combination as claimed in claim 4, wherein said receiver and transmitter are mounted in a handset, said handset including a manual switch, the actuation of said switch being effective to disconnect said battery from said transmitter without disconnecting it from said network.

6. In a telephone system, the combination as claimed in claim 3, wherein said negative feedback means comprises an inverse feedback gain control including a resistance, a variable portion of which is common to both said input circuit and said output circuit.

7. A local battery telephone instrument comprising a carbon transmitter and a receiver, a transformer having a plurality of windings, a common transmitting and receiving circuit including a first one of said windings, a local transmitting circuit including said transmitter and a second one of said windings, a source of direct current, means for supplying current from said source to said carbon transmitter by way of said local transmitting circuit, a local receiving circuit including said receiver and a third one of said windings, a transistor amplifier interposed between said third winding and said receiver for amplifying voice current incoming to said receiver by way of said third winding, said transistor amplifier including a body of semiconductive material with base, emitter, and collector electrodes, and a resistance network connected in said last mentioned circuit for supplying said electrodes with direct current bias potentials from said source.

8. A local battery telephone instrument comprising a carbon transmitter and a high impedance receiver, a transformer having a plurality of windings, a common transmitting and receiving circuit including a first one of said windings, a local transmitting circuit including said transmitter and a second one of said windings, a source of direct current, the last mentioned circuit effective to supply current to said transmitter from said source, a local receiving circuit including said receiver and a third one of said windings, a transistor amplifier interposed between said third winding and said receiver for amplifying voice currents incoming to said receiver by way of said third winding, said transistor amplifier including a body of semiconductive material with base, emitter, and collector electrodes, a resistance network connected with said amplifier for supplying said electrodes with direct current bias potentials from said source, and a capacitive equalizing network connected in shunt with said receiver to counteract the overemphasis of higher voice frequencies due to the high inductivity of said receiver and thereby supply voice currents to the receiver at approximately the same power level throughout the range of voice frequencies.

References Cited in the file of this patent

UNITED STATES PATENTS

| | | |
|---|---|---|
| 1,478,078 | Wente | Dec. 18, 1923 |
| 2,189,994 | Reier | Feb. 13, 1940 |
| 2,247,507 | Lanham | July 1, 1941 |
| 2,369,144 | Herrick | Feb. 13, 1945 |
| 2,675,433 | Pankove | Apr. 13, 1954 |